Aug. 18, 1925.
H. C. DREISCHERF
1,550,305
VALVE OPERATING NOZZLE FOR AIR HOSE
Filed March 31, 1922
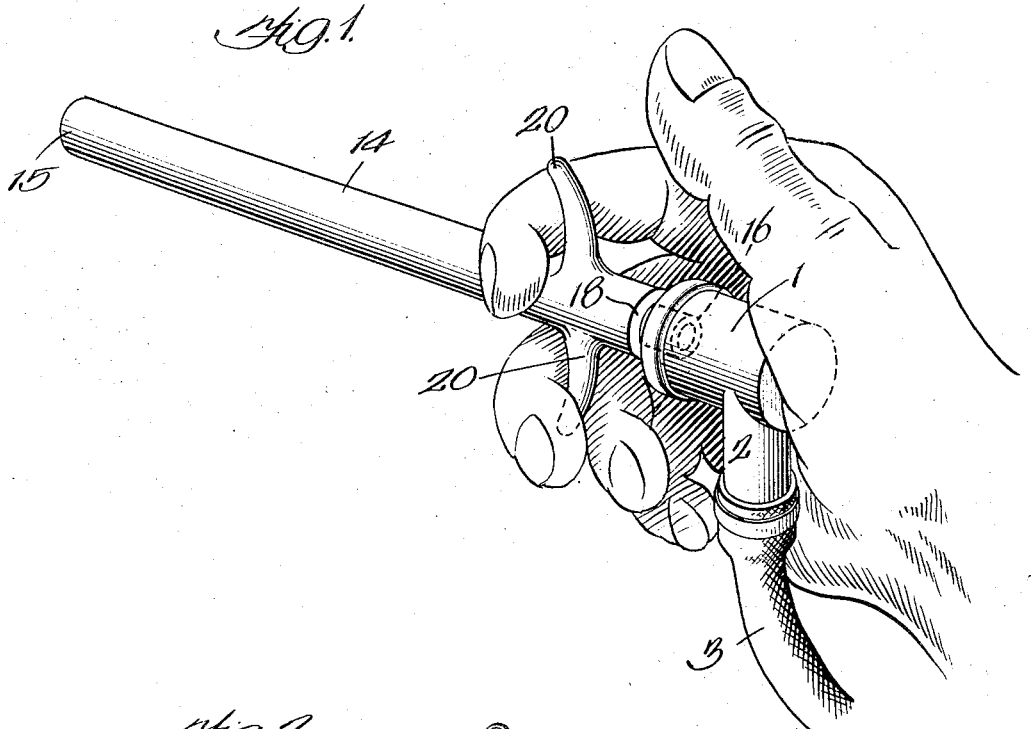
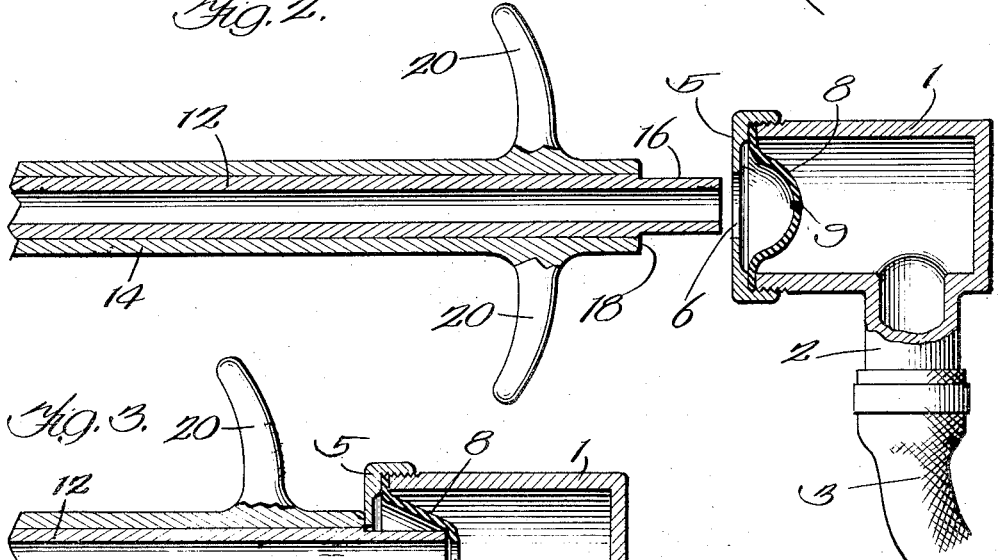
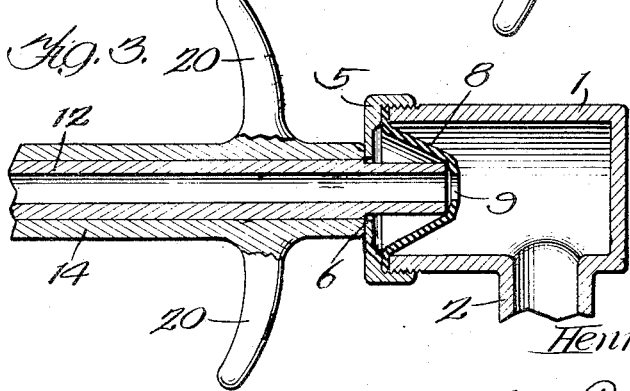
Inventor:
Henry C. Dreischerf
By Cheever & Cox.
Attys.

Patented Aug. 18, 1925.

1,550,305

UNITED STATES PATENT OFFICE.

HENRY C. DREISCHERF, OF BLUE ISLAND, ILLINOIS.

VALVE-OPERATING NOZZLE FOR AIR HOSE.

Application filed March 31, 1922. Serial No. 548,518.

*To all whom it may concern:*

Be it known that I, HENRY C. DREISCHERF, a citizen of the United States, residing at Blue Island, in the county of Cook and State of Illinois, have invented a certain new and useful Improvement in Valve-Operating Nozzles for Air Hose, of which the following is a specification.

It is common practice for automobile service stations and garages to maintain a supply of compressed air for inflating tires. A long hose is connected to the air storage tank and at the free end of it is secured a fitting which consists of a combined cap and valve. The valve consists of an apertured, self closing, flexible diaphragm and automatically prevents the escape of air when the hose is not in use and the cap fits over the small filler tube which leads to the inside of the inner tube of the tire. This combined cap and valve is so constructed that all that is necessary when the screw is removed from the filler tube is to place the cap over the end of the filler tube whereupon the valve in the cap is automatically opened and the air valve in the filler tube is automatically opened and air flows through from the air hose to the inside of the inner tube. In other words, common practice is to provide a fitting at the free end of the air hose so constructed that when the filler cap is removed, all that is necessary to transfer air from the hose to the inner tube is to adjust the fitting over the end of the filler tube on the tire. But air can be readily put to other uses at service stations and garages than the mere filling of inner tubes. For example, a jet of air is useful in cleaning the upholstery and other parts of passenger vehicles. It would also be useful for blowing out engines, radiators and other places where dust or foreign matter tends to collect. Under present conditions, however, a jet of air cannot be readily obtained. The fittings are not adapted for the delivery of a jet of air and to obtain such jet it is necessary to remove the fitting and substitute some kind of a valved nozzle. This involves time and labor, for the fittings are not readily removable, and a substitution cannot well be made without first going to the tank and shutting off the supply of compressed air from the tank to the hose. Then after the substitution has been made, the air must again be turned on at the tank.

The object of my invention is to provide a tool or device which will make it possible to obtain an air jet in cooperation with and without requiring the removal of the above described air hose fitting.

I obtain my object in the manner illustrated in the accompanying drawings in which Figure 1 is a perspective view illustrating not only my device, but the air hose fitting and the manner in which the two are grasped in the hand of the user.

Figure 2 is an axial section of the parts shown in Figure 1 except that the hand of the user is not shown. In this view my device is shown in position to be brought into cooperative relation with the air hose fitting.

Figure 3 is similar to Figure 2 except that my device and the air hose fitting are shown in cooperative relation.

Like numerals denote like parts throughout the several views.

The most common, if not standard, air hose fitting of today consists of a cylindrical casing 1 having a duct 2 at the side adapted to be permanently fastened to the air hose 3. It will be understood that this air hose is connected to a suitable storage tank (not shown) and is usually 20 or 30 feet in length so that tires within a considerable radius of the storage tank may be within range of the apparatus. Secured to the forward end of the casing 1 is a screw cap 5 having a central aperture 6 for accommodating the valved end of a filler tube or stem of a vehicle tire (not shown). A cupped flexible diaphragm 8 is mounted within the chamber, and has a slit 9 or other opening at the center. This diaphragm forms a valve which is self closing so as to automatically prevent the escape of air as soon as the fitting is removed from the filler tube or stem of the tire. When the fitting is applied to the end of the filler tube, the latter enters far enough into the diaphragm to open the slit 9 and permit the air to flow, but as soon as the fitting is removed from the tube the air pressure in the air hose and the natural resilience of the diaphragm causes the latter to close and conserve the supply of air. The construction and operation of this fitting are well known.

Now referring more particularly to the device which embodies my invention, a tube 12 which may consist of ordinary ¾ inch pipe, is enclosed within a hollow cylindrical casing 14 of malleable iron or any other suitable material. These are preferably coterminate at the forward end 15 so as to form a nozzle through which the compressed air may be discharged in the form of a jet. At the rear end the tube 12 extends beyond the inner end of the hollow cylindrical casing 14, thus forming a nipple 16 of such diameter as to fit slidingly into the aperture 6 in the air hose fitting, and of such length that when fully inserted it will open up the slit 9 of the diaphragm 8 so that air may pass from the fitting to the tube 12. An annular shoulder 18 is formed by the inner end of casing 14, and this forms a stop for limiting the distance to which the nipple can be inserted into the fitting. Lugs 20 project from opposite sides of the casing near the inner end thereof, said lugs forming a handle adapted to be grasped by the fingers of the user, as illustrated in Figure 1.

In practice, under ordinary conditions my device will be absent from the air hose fitting, for the most common use for the compressed air is the filling of tires. When, however, a jet of air is wanted for any purpose, the operator simply inserts the nipple 16 into the orifice 6 in the cap of the air hose fitting, bringing the shoulder 18 into engagement with the cap. When the nipple is inserted this far, it will open up the slit 9 in the diaphragm 8 and hence there will be a free passage from the air hose to the inner tube 12 of my device. Consequently compressed air will issue from the nozzle in the form of a jet which may be used for various purposes as hereinabove suggested. The configuration of the standard fitting 1 is such that it may be readily contained within the palm of the hand, and in my device the handles or lugs 20 are so placed that they may be readily grasped by the first and second finger of the hand when the tool is in operative position. By reference to Figure 1 it will be observed that when the two parts are in cooperative relation they may be readily held there by one hand, the advantage being that the operator has his other hand free for lifting cushions or doing such other work as may be necessary for the project in hand. When through requiring the jet, or if for any reason it is desired to temporarily shut off the flow of air, all that is necessary is to withdraw my device from the air hose fitting, whereupon the diaphragm 8 will automatically close and seal the opening. Thus it will be evident that my device furnishes a most simple and yet a very effective tool for rendering the ordinary air hose fitting available where a jet of air is wanted.

I do not wish to be restricted to the precise construction of the device to any greater extent than called for by the appended claims. It will be evident that my entire device may be formed of a single piece of metal if desired. In other words, all parts may be integral with each other, although for reasons of manufacture I prefer to employ an ordinary piece of pipe for the inner portion and a separate piece for the casing. It will be understood, of course, that when two parts are thus employed, they will be rigidly fastened together by any appropriate means.

Having thus described my invention, what I claim as new and desire to secure by Letters Patent is:

1. A hand tool for use in connection with a valve of the type used for compressed air hose and having a casing adapted to be held in the hollow of the hand and provided with a self-closing, flexible, apertured diaphragm which opens when repulsed from the front; said tool being tubular and having finger lugs projecting from opposite sides near the butt end whereby the tool may be grasped in the fingers of the same hand which holds the valve, the forward end of the device constituting a nozzle and the butt end serving to enter the aperture in the valve casing for acting upon the diaphragm for opening it.

2. A hand tool for use in connection with a valve of the type used for compressed air hose and having a casing adapted to be held in the hollow of the hand and provided with a self-closing, flexible, apertured diaphragm which opens when repulsed from the front; said tool being tubular and having finger lugs projecting from opposite sides between the ends of the device, said lugs being located nearer to the butt end than to the forward end whereby the forward end constitutes a nozzle and the butt end projects sufficiently to pass through the aperture in the valve casing and act upon the diaphragm within, the butt end of the device being of reduced external diameter to thereby form a shoulder for abutting the outer end of the valve casing to form a stop for limiting the distance to which the tool may be inserted into the valve casing.

3. In a device of the class described, the combination of a pipe, a casing enclosing said pipe, the pipe projecting beyond the casing at one end to form a reduced nipple, and oppositely projecting lugs extending laterally in opposite directions from the casing at a point near the nipple.

In witness whereof, I have hereunto subscribed my name.

HENRY C. DREISCHERF.